UNITED STATES PATENT OFFICE.

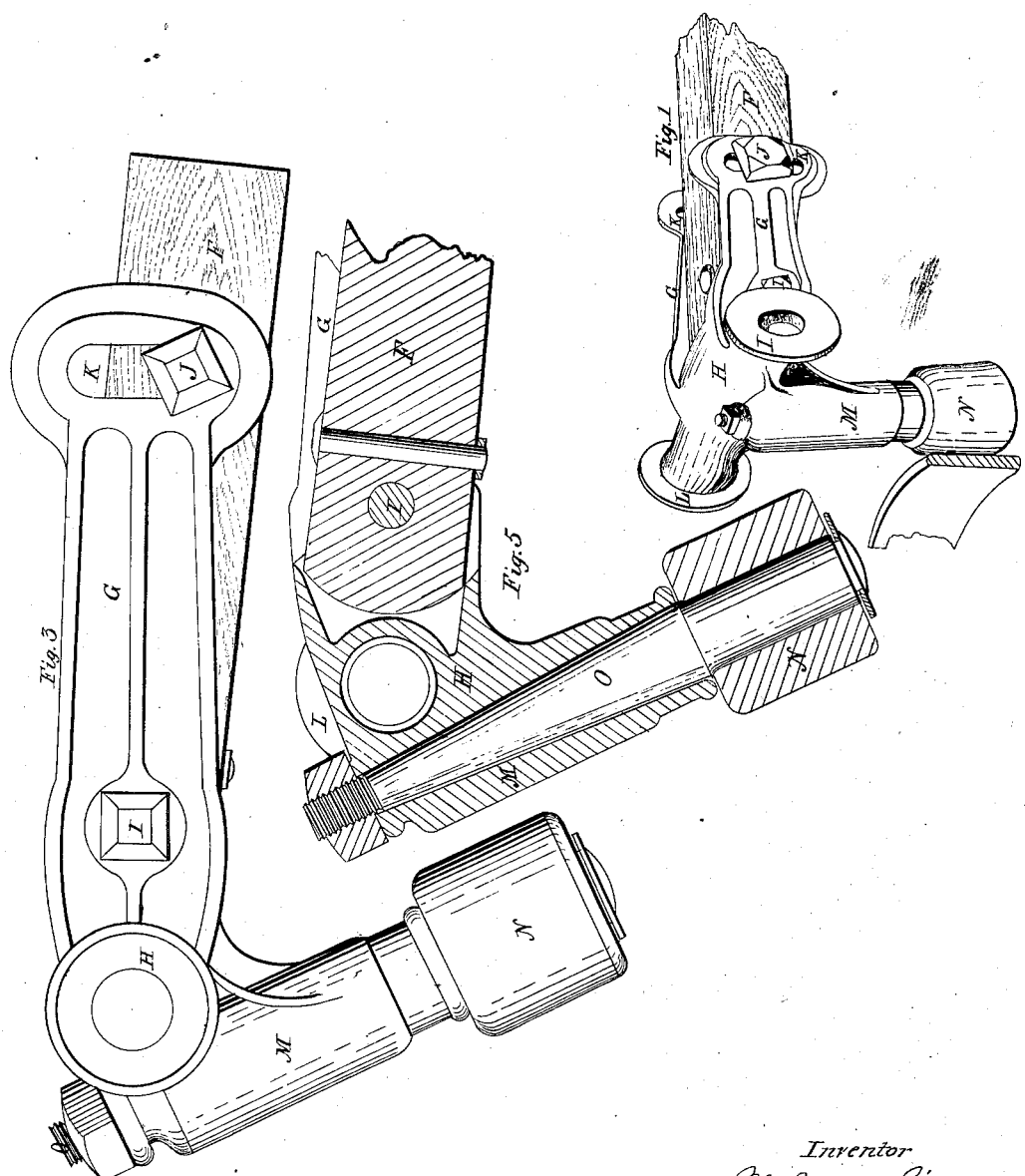

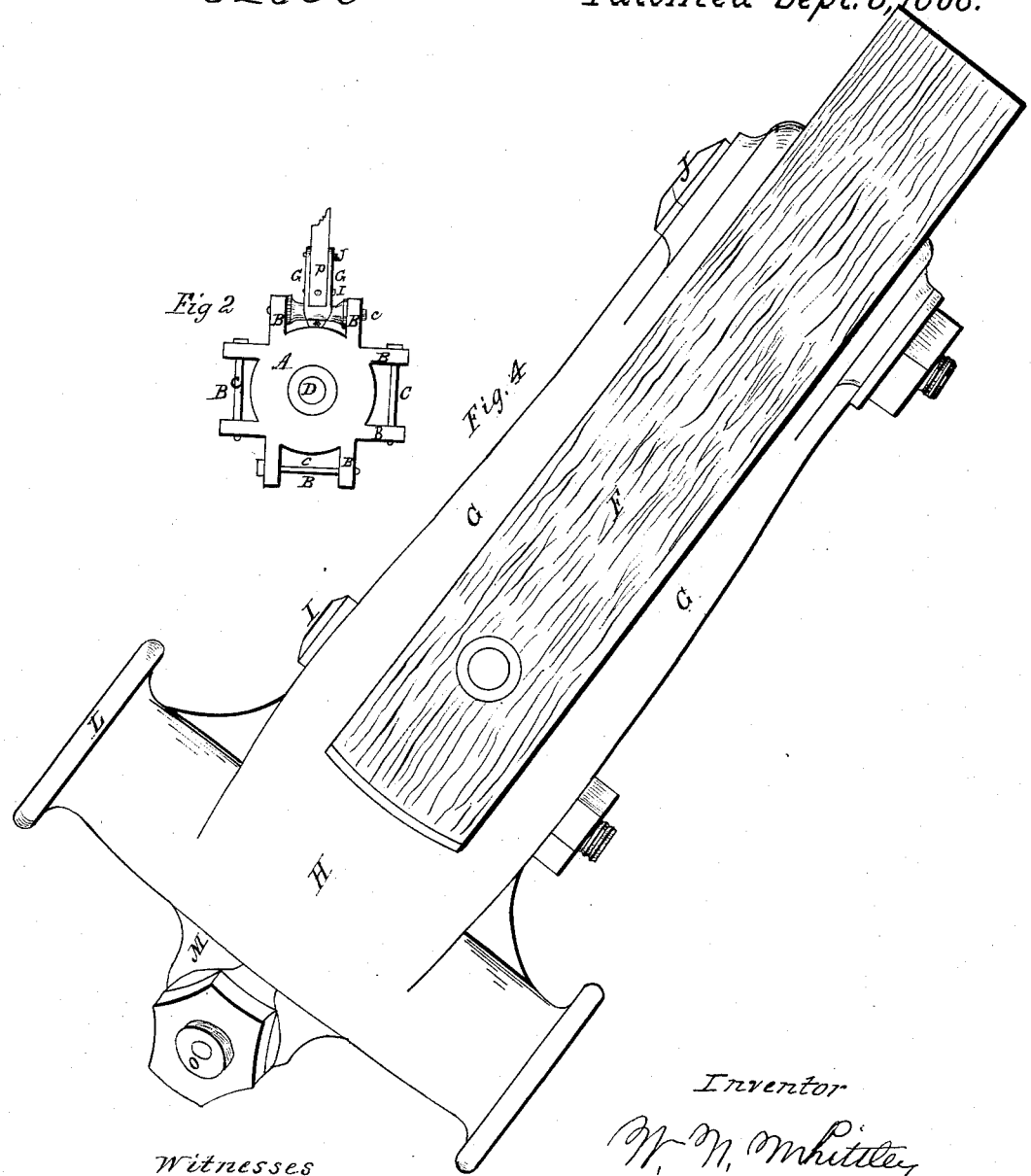

WILLIAM N. WHITELEY, OF SPRINGFIELD, OHIO.

IMPROVEMENT IN HARVESTER REELS AND RAKES.

Specification forming part of Letters Patent No. 82,050, dated September 8, 1868.

*To all whom it may concern:*

Be it known that, WILLIAM N. WHITELEY, of Springfield, in the county of Clarke and State of Ohio, have invented a new and useful Improvement in Harvester Rakes and Reels; and I do hereby declare the following to be a full, clear, and exact description of the same, reference being had to the accompanying drawings, in which—

Figure 1 is a perspective view of the head of a rake-arm. Fig. 2 is a plan view of the shaft-head, showing the rake-arms in place. Fig. 3 is a side elevation of the rake-arm head detached. Fig. 4 is a plan of the same. Fig. 5 is a vertical longitudinal section of the same.

This invention relates to that class of rakes and reels which have independent arms jointed to a revolving shaft which stands vertical, or nearly so, to the plane of the cutting apparatus; and it consists in the manner of constructing and arranging the cast-iron head to which the rake-arm is attached, and in which the moving part of the above-mentioned joint is formed.

That others may fully understand my invention, I will particularly describe it.

A is the cast-iron shaft-head, constructed with four or more jaws or recesses, B, into which the rake-arm heads are inserted and secured by a joint-bolt, C, which passes from side to side through said jaws, and through the cast head attached to the rake-arm. Upon said joint-bolt, as a center, the rake-arm may move freely in a vertical plane, so as to rise and fall in respect to the plane of the platform and cutting apparatus. The head A is keyed or otherwise rigidly secured to the reel-shaft D, and when said shaft revolves, the head and reel-arms are caused to revolve also. Motion may be imparted to the reel-shaft by means of a chain-wheel or some other proper and sufficient means. The rake and reel arms are caused to rise and fall in respect to the plane of the cutting apparatus by passing along the surface of a guideway, E, which is more or less inclined at different points, as required, to carry the rake or reel blade to the desired position.

The different parts of the harvesting-machine heretofore alluded to do not form any part of the invention included in the claims hereto annexed, as they are all common and well known, and allusion is made to them only for the purpose of rendering clear the operation and use of the parts now to be described.

The reel or rake arm is made of wood, and the rake or reel blade is attached to its outer end in the usual manner. The inner end of the rake or reel arm F is secured between the projecting arms G of the cast-iron head H. The arm F is secured between said arms G by two bolts, I and J, the former of which is inserted through holes formed in said arms, and through a hole made in the arm F near its inner end; and the latter bolt, J, passes through slots K K made in the outer ends of the arms G, and through a hole in the arm F, so that the arm F may be adjusted in relation to the head H, moving upon the bolt I as a pivot, and may be rigidly secured at any desired point by tightening the nut on the end of the bolt J, so as to clamp the ends of the arms G against the sides of the arm F.

The head H is made in the form of a tube, and is cored out through its central part, as shown in Fig. 6, so that it may bear upon the joint-bolt C only at the ends of the bearing. The flanges L are cast around the ends of the head, to give increased strength and steadiness to the head. At the rear of the head H is formed the hollow pendent stud M, to receive the bearing-bolt O of the friction-roller or traveler N. The hole through the stud M is made tapering from the lower end upward, as shown in Fig. 6, so that when the bolt O is made of corresponding shape and size the screw-nut at its upper end will draw it into its seat with such power as to render it perfectly rigid at all times and under all circumstances. This is of great importance, as the strain upon this part is considerable, and great rigidity is essential. The bolt O should be forged of steel, and that part which forms the frictional bearing of the traveler N should be tempered very hard, so as to be able to resist abrasion when not lubricated.

The roller N is made of iron cast in a chill-mold and around a chill-pin, so that its surface, both internal and external, is of the utmost hardness. The necessity for this mode of construction lies in the fact that the operatives who usually are charged with the care of harvesting-machines are unskilled in mechanics, and are consequently liable to neglect the lubrication of those parts which seem to be of minor importance; hence these rollers, if made of ordinary iron and unlubricated, would soon heat and cut the bearings, and their operation become impaired; but the extreme hardness of chilled iron will enable the roller so constructed to operate for a long time uninjured, even if entirely without lubrication. The head H is preferably made of malleable iron, for the purpose of giving it the greatest amount of strength with the least cost, and it may be cast of brass or any other malleable material.

Having described my invention, what I claim as new is—

1. The rake-head H with the arms G G, and with a long tube bearing for the joint-bolt, in the manner described, independent of the wooden arm F.

2. Attaching the friction-roller N to the cast rake-head H by means of a wrought bolt, one end of which forms the journal or bearing of said roller, and the other penetrates through said head, and is secured therein by a screw-nut or the equivalent thereof.

3. The pendent stud M, with a tapered socket for the correspondingly-shaped bolt O, which attaches the friction-roller to the head H, as set forth and described.

WILLIAM N. WHITELEY.

Witnesses:
CLAY WHITELEY,
L. H. LEE.